United States Patent [19]

Steer et al.

[11] Patent Number: 4,732,612

[45] Date of Patent: Mar. 22, 1988

[54] POLISH EMULSION COMPOSITIONS

[75] Inventors: Frank J. Steer; John A. Ferguson, both of Cincinnati, Ohio

[73] Assignee: The Drackett Company, Cincinnati, Ohio

[21] Appl. No.: 528,832

[22] Filed: Sep. 2, 1983

[51] Int. Cl.$^4$ .............................................. C09G 1/08
[52] U.S. Cl. ........................................ 106/10; 106/11; 106/271; 106/287.13
[58] Field of Search ............... 106/10, 11, 271, 287.13

[56] References Cited

U.S. PATENT DOCUMENTS

| | | | |
|---|---|---|---|
| 2,085,706 | 6/1937 | Schoeller et al. | 260/404 |
| 2,586,780 | 2/1952 | Breuer et al. | 106/10 |
| 2,646,436 | 7/1953 | Breuer et al. | 260/410.6 |
| 2,782,124 | 2/1957 | Rosenberg et al. | 106/10 |
| 2,907,664 | 10/1959 | Schoenholz et al. | 106/10 |
| 2,925,349 | 2/1960 | Koenig et al. | 106/10 |
| 2,963,379 | 12/1960 | Kaupp et al. | 106/268 |
| 3,053,681 | 9/1962 | Kaupp et al. | 106/268 |
| 3,060,046 | 10/1962 | Kaupp et al. | 106/270 |
| 3,062,671 | 11/1962 | Kaupp et al. | 106/268 |
| 3,143,431 | 8/1964 | Kaupp et al. | 106/8 |
| 3,300,321 | 1/1967 | Rosenberg et al. | 106/6 |
| 3,393,078 | 7/1968 | Lockhart et al. | 106/8 |
| 3,395,028 | 7/1968 | Mackles | 106/8 |
| 3,437,496 | 4/1969 | Rosenberg et al. | 106/10 |
| 3,745,033 | 7/1973 | Hutchison | 106/270 |
| 3,836,371 | 9/1974 | Kokoszka | 106/10 |
| 3,847,622 | 11/1974 | Brandl et al. | 106/10 |
| 3,929,492 | 12/1975 | Chapman et al. | 106/3 |
| 4,013,475 | 3/1977 | Liebowitz et al. | 106/10 |
| 4,265,663 | 5/1981 | Gilcinski et al. | 106/10 |

FOREIGN PATENT DOCUMENTS 1041686 10/1978 Canada .
3106866 9/1982 Fed. Rep. of Germany .

OTHER PUBLICATIONS

Industrial Waxes, vol. I, Natural & Synthetic Waxes, H. Bennett, pp. 117-121 (Chemical Publishing Co., 1963).
Product Data-Hoechst Waxes, American Hoechst Corp. Ind. Chem. Div. (Apr. 1979) (4 pages).
Product Data-Hoechst Waxes in Furniture Polishes, American Hoechst Corp. Ind. Chem. Div. (Sep. 1978) (6 pages).
Product Data-Hoechst Wax S, American Hoechst Corp. Ind. Chem. Div. (Aug. 1981) (1 page).
Carbowax Polyethylene Glycols, Union Carbide Corp. (5 pages).
The Pluronic Grid, 5th ed., Wyandotte Chemicals, (4 pages).

Primary Examiner—Amelia Burgess Yarbrough
Attorney, Agent, or Firm—Charles Zeller

[57] ABSTRACT

A furniture polish composition characterized by an internal aqueous phase and an external oil phase, the composition containing an ethoxylated montan acid wax in an amount of from 0.5 to 5% by weight, which constituent functions both as an emulsifier and as the wax. Also included in the composition is from 10 to 50% hydrocarbon solvent; from 0 to 15% polysiloxane, and water. A coemulsifier may be included at low levels, less than 0.5% by weight, the weight ratio of the ester to the emulsifier being greater than 1:1.

30 Claims, No Drawings

POLISH EMULSION COMPOSITIONS

FIELD OF INVENTION

The present invention relates to furniture polish compositions characterized by being water-in-oil emulsions, the composition being in nonaerosol liquid or paste, or aerosol form. More specifically, the compositions herein relate to the incorporation as the emulsion-forming agent a component that is an ester of a long chain paraffinic hydrocarbon, having both lipophilic and hydrophilic moieties, the hydrophilic moiety being a polyalkoxy group. Most specifically, the emulsion-forming agent is an ethoxylated montan wax ester obtained, for example, as the reaction product of montanic acid and polyethylene glycol.

BACKGROUND OF INVENTION

Water-in-oil polishes containing a wax constituent in combination with an emulsifier are well known in the art. In U.S. Pat. No. 3,847,622 to Brandl, which contains a wax component in addition to a solvent, an emulsifier, a lubricant, and water, the wax component comprises from 0.1 to 3.0% by weight of the composition, and is a montan or lignite wax having an acid value of 90 to 160, preferably 100 to 130. The emulsifier may be sorbitan sesquioleate, tall oil alkanolamides, polyglyceroleate, or the reaction product of morpholine-2-amino-2- methyl-1-propanol or methoxypropylamine and a fatty acid such as oleic or stearic acid, or montanic acid, the emulsifier being present in an effective amount, e.g., from 0.25 to 3.0% by weight of the composition. An organopolysiloxane, e.g., a dimethyl polysiloxane, in the amount of from 0.5 to 9% by weight, having a viscosity of from 20 to 15,000 cs. at 25° C. is included to enhance the polishing character of the composition, and to provide lubricity. Preferably, the polysiloxane is a mixture of two polysiloxanes, one having a viscosity of 50 to 550 cs. and the other having a viscosity of 950 to 15,000 cs. The organic solvent has an aniline point of from $-22°$ to 185° F., and may be a hydrocarbon, preferably an isoparaffinic hydrocarbon, or a chloro-substituted hydrocarbon.

Another example of a wax-containing polish composition is illustrated in U.S. Pat. No. 3,929,492 to Chapman, said composition containing from 0.1 to 5% wax, 0.5 to 10% organic polysiloxane, water and propellant. The wax constituent is any predominantly hydrocarbon aliphatic material of high molecular weight, including natural and synthetic waxes, ester-type waxes, for example, candelilla wax, carnauba wax, microcrystalline wax, petroleum wax, and synthetic resinous materials such as polyethylene and polypropylene. Emulsifiers are preferably incorporated into the Chapman composition, for example, longchain, fatty acid esters of polyhydroxylic compounds, such as the glycol, glycerol and sorbitol esters of oleic, stearic palmitic and lauric acids, ethoxylated fatty acids and amides, e.g., sorbitan monooleate. Also includable are nonionic emulsifiers such as polyethylene oxide adducts.

U.S. Pat. No. 3,395,028 to Mackles discloses an aerosol wax and silicone oil furniture polish which is a double emulsion consisting of a water-in-oil emulsion in which the outer oil phase contains the organic solvent and wax, and the inner-water phase has emulsified therein the silicone oil, the wax of the Mackles composition being microcrystalline wax, oxidized microcrystalline wax, paraffin wax, carnauba wax, beeswax, ceresin wax, and the like. The emulsifier in the Mackles composition may be sorbitan sesquioleate, tall oil alkanolamides, polyglycerol oleate, etc., usually present in the amount of 0.25 to 5.0% by weight of the total composition.

U.S. Pat. No. 3,393,078 to Lockhart, et al, discloses a wax-containing metal polish composition, the composition containing 1 to 10% microcrystalline wax and 1 to 15% montan wax having an acid value of 90 to 160. The emulsifiers suitable for incorporation into the Lockhart, et al, composition are those mentioned by Brandl, U.S. Pat. No. 3,847,622, above. However, in Lockhart at least part of the montan wax constituent is in the form of an oxidized montan wax-containing morpholine montanate groups resulting from the in situ reaction product of at least a part of the acid groups obtained by oxidation of the montan wax with morpholine or other amine, which constituent contributes to the emulsification of the composition.

A self-spraying wax composition is disclosed in U.S. Pat. No. 2,907,664 to Schoenholz, et al, which is an oil-in-water emulsion-type polish, and may contain as an example of a wax Gersthofen OP, a wax derived from montan wax, described as a mixture of the butylene glycol ester of montanic acid and calcium montanate. Amine soap, borax, sorbitan fatty esters, etc., are the designated emulsifiers.

Also of interest as disclosing wax-containing polish compositions are U.S. Pat. Nos. 4,013,475 to Liebowitz, et al, 4,265,663 to Gilcinski, et al, and 3,836,371 to Kokoszka.

In all of the above wax-containing compositions, the wax must be dissolved/dispersed in one or both of the liquid phases. Also, in all of the above compositions, emulsifiers are used to couple the water and oil phases. The emulsifier is not typically an active polishing aid, but rather detracts from the desired polishing end benefit because the emulsifier is codeposited onto the surface during use along with the wax. It is known that as the concentration of conventional emulsifiers increases, polish performance with respect to gloss and resistance to smears decreases. Hence, the elimination or the substantial reduction in the level of these conventional emulsifiers included in the polish composition or by utilizing a material that functions as both an active polishing ingredient and an emulsifier is desirable.

Some of the patented compositions referred to above teach the modification of certain natural waxes, for example, montan wax, to provide such derivative with emulsifiers properties. For example, U.S. Pat. Nos. 3,847,622 to Brandl and 3,393,078 to Lockhart, et al, disclose reaction products of an amine and oxidized montanic wax.

U.S. Pat. Nos. 2,782,124, 3,300,321, and 3,437,496, each to Rosenberg, et al, 2,925,349 to Koenig, et al, and 3,143,431, 2,963,379, 3,062,671, 3,053,681 and 3,060,046, each to Kaupp, et al, disclose the esterification of montan waxes so as to modify the hardness and performance in dry-bright polish compositions. Thus, Rosenberg, et al, discloses in the '124 patent the after-esterified oxidation product of crude montan wax in combination with saturated and unsaturated fatty alcohols of long carbon chain lengths, such as monooleates or palmitates or polyoxysorbitan. The ester wax disclosed in the '124 patent is derived from the reaction with low molecular weight polyhydric aliphatic alcohols, such as ethylene glycol, of six carbons, it being inadvisable, according to the teaching of the patent, to use as an alcohol of more than six carbons.

The '321 Rosenberg, et al, patent discloses a process for the manufacture of dry-bright polish emulsions, which compositions incorporate a wax or wax mixture containing an oxidation product of deresinified or underesinified crude montan wax reacted with a low molecular weight polyhydric alcohol, preferably glycols, to form the corresponding ester. These waxes cannot be emulsified alone by the usual processes, but require the reaction product of oleic or other fatty acids with selected amines.

Amine derived emulsifers are also utilized in dry-bright compositions in accordance with the process described in the '496 Rosenberg, et al, patent, wherein an ester wax based upon the reaction product of montan wax and a low molecular weight polyhydric alcohol is again described.

The Koenig, et al, '349 patent also discloses ester waxes esterified with monohydric and polyhydric alcohols, the polyhydric alcohols being glycols of six or fewer carbons, and the monohydric alcohols having between 16 and 30 carbons. Emulsifiers are also incorporated in the composition, and are the addition products of 15–30 moles of ethylene oxide to either saturated or unsaturated fatty alcohols containing 16–20 carbon atoms per molecule.

The '431, '379, '671, and '046 patents to Kaupp, et al, all relate to dry-bright polish waxes, wherein crude montan wax is oxidized and subsequently esterified with monohydric or dihydric alcohols. The '681 patent to Kaupp, et al, discloses an ester based on oxidized montan wax in which the reactant is R[X—(R'—O)$_n$H]$_m$Z, wherein R is a cyclic radical, X is nitrogen or oxygen, R' is an alkylene radical of at least 2 carbons, n is from 1 to 12, m is the minimum valance of X less 1, and Z is greater than 1, but less than above 4.

Useful synthetic wax compositions are disclosed in U.S. Pat. No. 3,745,033 to Hutchison, the synthetic waxes being substitutes for natural waxes, primarily beeswax, and made by blending high molecular weight α-branched mono- and dicarboxylic acids with microcrystalline petroleum wax.

U.S. Pat. Nos. 2,586,780 and 2,646,436 to Breuer disclose treatment of bleached montan wax with a glycol to partially esterify the monocarboxylic acids and to convert a substantial quantity of the dibasic acids to mono-esters and thereafter esterify the remaining free carboxylic groups with a higher polyhydric alcohol containing 3 to 8 hydroxy groups.

Although certain esters of montanic acid waxes have been included in polish compositions, as noted above, in particular in dry-bright polish compositions, these products do not serve to stabilize the emulsion, but are employed for the enhanced ease of dispersibility while providing gloss. All of these compositions require an emulsifier at substantial levels to stabilize the emulsion. We have found that the disadvantages referred to above of including an emulsifier may be avoided by employing as the wax a montan wax ester having a hydrophilic moiety obtained by esterification of montanic acid with a polyethylene glycol, the polyethylene glycol having on average between about 2.5 to about 6.0 ethoxy groups, thereby establishing a material providing both wax characteristics when used in a furniture polish and at the same time providing sufficient water affinity to act as the emulsifier in the polish composition.

SUMMARY OF INVENTION

It is an object of the present invention to provide a furniture polish composition characterized by an aqueous internal phase, and an oil external phase, the composition containing a montan wax ester providing both emulsifier and wax properties to said composition.

It is a further object of the present invention to incorporate a montan wax ester in a furniture polish composition, the montan wax ester being an ethoxylated montan wax ester obtained, for example, as the reaction product of montanic acid and polyethylene glycol, said incorporation reducing the concentration of conventional emulsifier required in said composition.

Another object of this invention is to provide a furniture polish composition as described above having good gloss and rub out characteristics.

The two-phase, single-emulsion furniture polish compositions of the present invention are characterized by an external oil phase and an internal water phase, the compositions comprising on a weight basis:

(a) from about 10 to about 50% of a hydrocarbon solvent having an initial boiling point above about 85° C. and an end boiling point below about 200° C.;

(b) from about 0 to about 15% of a polysiloxane having an average viscosity of from about 20 to about 30,000 cs. at 25° C.;

(c) from about 0.5 to 5% of a montan wax ester having the formula:

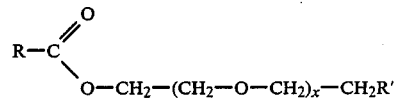

wherein R is the alkyl group of montanic acid, R—COOH; R' is hydrogen or a hydroxy radical, and x has an average value of from 2.5 to about 6.0, preferably from about 2.5 to about 4.5; and (d) from about 30 to about 90% water, the components (a), (b) and (c) comprising the external oil phase.

The compositions of the present invention may also contain a conventional emulsifier, preferably in an amount of less than 0.5% of the composition, with the ratio of the ester to the conventional emulsifier greater than 1:1, preferably greater than 3:1, and may also contain a hydrocarbon wax constituent.

The composition is made by preparing a premix of the oil phase constituents, heating the premix to dissolve the constituents, slowly adding a heated aqueous phase premix to the oil phase premix under vigorous agitation, and slowly cooling the mixture.

DETAILED DESCRIPTION OF INVENTION

The two-phase, single-emulsion furniture polish compositions of the present invention are in the form of a water-in-oil emulsion wherein the disperse phase is the water and the continuous phase or media is the oil. Thus, water is the inner phase or dispersoid, while oil is the outer phase.

In typical emulsions, whether oil-in-water type or water-in-oil type, stability is obtained by the addition of an emulsifier, which retains the two phases in suspension by reducing the interfacial surface tension between said phases. Hence, the disperse phase does not coalesce. A requisite for a suitable emulsifier in a water-in-oil emulsion is for said agent to have an affinity for the disperse water phase, and yet be soluble in the continuous oil phase. Such emulsifiers have, as is well known, a hydrophilic-lipophilic balance (HLB), i.e., the balance of the size and strength of the hydrophilic or water-loving, polar moiety and the lipophilic or oil-loving, nonpolar moiety, of between about 2 to 6.

Characteristically, a good wax component of a furniture polish should be a hard wax, yet capable of being buffed to a good shine. As indicated in the section Background of Invention, a montan derived wax is an excellent hard wax for incorporation in furniture polishes. In conventional furniture polish emulsion compositions containing a wax, application of the composition to the wood surface permits the oil solvent to strip away old wax and oil borne soils, while the new wax is essentially simultaneously deposited on the wood surface. The water phase of the emulsion enhances spreadability of the composition, reduces flammability, acts to dissolve and remove water borne stains, and acts as a diluent to reduce cost.

It is known that the efficacy of a water-in-oil furniture polish emulsion composition varies inversely with the concentration of the emulsifier. It is believed that this decrease in effectiveness with increasing emulsifier concentration is a result of codeposition of the emulsifier with the wax resulting in a softening of the wax and a result of the emulsion breaking characteristics upon rub out. In considering the reduction or elimination of conventional emulsifiers, with perhaps combining the functions of the wax and the emulsifier within one constituent, applicants herein investigated certain ester compounds of montan wax, which compounds would have a hydrophilic moiety providing the requisite hydrophilic-lipophilic balance. It was found that only particular esters would satisfactorily provide an emulsion and, at the same time, provide good wax characteristics when applied to a wood surface.

The furniture polish emulsion compositions of the present invention comprise on a weight basis:

(a) from about 10 to about 50% of a hydrocarbon solvent having an initial boiling point above about 85° C. and an end boiling point below about 200° C.;

(b) from about 0 to about 15% of a polysiloxane having an average viscosity of from about 20 to about 30,000 cs. at 25° C.;

(c) from about 0.5 to about 5% of a montan wax ester having the formula:

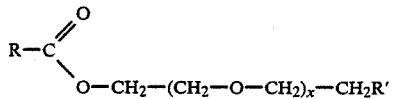

where R is the alkyl group of montanic acid, R—COOH; R' is hydrogen or a hydroxy radical, and x has an average value of from 2.5 to about 6.0; and (d) from about 30% to about 90% water, the components (a), (b), and (c) comprising the continuous oil phase, and component (d) comprising the disperse phase.

Hydrocarbon Solvent (a)

The solvent employed is a hydrocarbon petroleum solvent having an initial boiling point above about 85° C. and an end boiling point below about 200° C. In selecting the solvent, the critical parameter is the rate of evaporation from the surface being polished. Too rapid an evaporation rate fails to provide adequate time for the solvent to penetrate and dissolve the stains and old wax on the wood surface, while too slow an evaporation rate results in smearing and reduced gloss, as the polishing components are not adequately deposited on the wood surface. The proper rate of evaporation will, of course, be determined in part by the concentration of the other constituents, particularly the polysiloxane and water, and the rapidity at which the emulsion is to break. However, as a general parameter, solvents having vapor pressures at 38° C. of between about 4 to about 20 kPascals are satisfactory. Typical of the solvents useful in the present invention are octane, paraffin hydrocarbons such as naphtha, isoparaffinic hydrocarbons, for example those designated by the trade name Isopar, especially Isopar E, which is a mixture principally of $C_8$ isomers made by Exxon Corporation, and mineral spirits, e.g., Shell Mineral Spirits 150-66 made by Shell Chemical Company Petrochemicals Division.

The amount of solvent is, of course, a function of the solubility of the ester and the polysiloxane incorporated in the continuous oil phase of the composition, but will range generally from about 10% to about 50%, preferably from about 15 to about 35%, on a weight basis.

Polysiloxane Component (b)

The polysiloxane component is incorporated to provide lubricity, polishing, and shine. In particular, the polysiloxanes have been found to provide easy rub out, thereby making the polish composition easier to apply. The polysiloxane may be provided as a homopolymer or a copolymer having the formula $(R_A)_3SiO[(R_B)_2SiO]_n(R_C)_3$ wherein $R_A$, $R_B$, and $R_C$ are monovalent hydrocarbon groups, preferably free of aliphatic carbon to carbon multiple bonds, and n is an integer generally between 50 and 1000. Preferably, the polysiloxanes used herein have a viscosity of from about 20 to about 30,000 cs. at 25° C., although optimum results are achieved at an average viscosity range of from 100 to 1000 cs. It is desirable that the polysiloxane constituent be a blend of both low- and high-viscosity materials, thereby providing the referred to average.

Typical polysiloxanes suitable for use herein are dimethylpolysiloxane, diethylpolysiloxane, diphenylpolysiloxane, methylethylpolysiloxane, alkylarylpolysiloxane, and block polymers of organopolysiloxanes. Dimethylpolysiloxane, however, is preferred. The polysiloxanes comprise between about 0 to about 15% of the composition on a weight basis, preferably from about 2 to about 6%.

Montan Ester Component (c)

The montan wax ester component incorporated in the furniture polish composition of the present invention should be soluble in the solvent phase of the composition, but should have sufficient hydrophilic properties so as to provide affinity for the water phase, and hence achieve its dual function as a polish aid and as an emulsifier. The montan wax ester incorporated in the composition should provide the qualities of a wax when applied to the wood surface, for example, should be substantive to wood and provide a high sheen upon buffing. Furthermore, it is desirable that the sheen obtained upon buffing be resistant to stains, particularly water spotting, and be resistant to smearing.

We have found that the aforesaid properties of the montan wax ester component are obtainable by esterification of montanic acid with a certain class of hydrophilic reactants.

Montan wax esters we have found to provide the requisite properties are esters selected from the group consisting of:

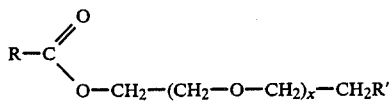

where R is the alkyl group attached to montanic acid,

R' is hydrogen or hydroxy, and x has an average value of between 2.5 to about 6.0.

Generally, montan wax (a lignite extract), is a mixture of hydrocarbons, the mixture comprising both straight and branched chain components. The average molecular weight is about 400, the montan wax having about 28 carbon atoms. Montanic acid wax is made by chromic acid bleaching of montan wax, and has an average molecular weight of about 425. Although synthetic waxes similar to montan wax are not generally commercially available, the esters of the present invention include those based on long chain hydrocarbon compounds having between about 22 to about 32 carbon atoms.

The montanic wax esters of the present invention are incorporated in the furniture polish compositions herein in the amount of between 0.5 and 5% by weight. Too high a concentration of ester is deleterious because resistance to smearing decreases and ease of rub out increases, while too low a concentration fails to adequately provide protection of the wood surface and the degree of sheen desired. Preferably, at ester concentrations less than 2.5%, it is desirable to include between 0.1 to 0.5% of a conventional emulsifier, as is described below. Above 2.5% ester concentrations, the inclusion of the emulsifier is not preferred.

Above an average value of x of about 6.0, the hydrophilic nature of the ester increases to a point where the ester becomes readily dispersible in the water phase, hence losing its emulsifying ability and impairing the stability of the emulsion, while at an x below about 2.5, the montan wax ester lacks emulsifying properties. Preferably, the average value of x is between about 2.5 to about 4.5, most preferably x has a value of between about 3 to about 4.0.

The montan wax esters of the present invention were prepared by reacting oxidized deresinified montan wax with polyethylene glycols ranging from an average molecular weight of about 200 to about 9,000, corresponding, respectively, to an average value of x from about 3 to about 140. The ester product based on said polyethylene glycols provided the desired combination of water dispersibility and oil solubility at a value of x of about 3. At a value of x of about 6, the ability of the ester to provide emulsifying properties was inferior. At a value of x of about 7.7, the emulsifying properties were severely compromised, the emulsion formed being an oil-in-water emulsion. The formation of by-products, particularly di-esters, is believed to deleteriously affect the emulsifying properties of the montan wax ester and it is preferred to synthesize the ester so as to avoid these by-products. Accordingly, it is preferred to carry out the reaction with a dry-gas purge at temperatures between 100° to 200° C., preferably between 100° to 140° C. It is also considered preferable to carry out the reactions with a molar ratio of montanic acid to polyethylene glycol in the range of from about 1:1 to 1.5:1. At these conditions, the reaction was found to be between 60 to 90% complete, based on acid value, after 2 to 6 hours. The ester product of the present invention should have an acid value of less than 30, preferably less than about 20. Any conventional catalyst may be used in the synthesis, for example paratoluene sulfonic acid (PTSA).

Miscellaneous Adjuvants

The furniture polish compositions may also include other adjuvants conventionally incorporated in such compositions.

Conventional emulsifiers having a HLB of between about 2 to about 6, for example, glycol, glycerol and sorbitol esters of oleic, stearic, palmitic and lauric acids, especially sorbitan sesquioleate and sorbitan tristearate, may be included, although the level of same is less than normally required to achieve a stable emulsion. Inasmuch as conventional emulsifiers detract from the efficacy of the polish, this decrease is extremely advantageous. In addition, a coemulsifier system based upon the montan wax ester of the present invention and a conventional emulsifier may be employed to optimize the emulsion-breaking characteristics so that the polish composition is distributed easily on the wood surface.

When employed, to achieve the benefits referred to herein, the conventional emulsifer should be less than about 0.5% of the composition, with the ratio of the ester to the conventional emulsifier greater than about 1:1, most preferably greater than 3:1. The inclusion of emulsifier is preferred at ester concentrations below about 2.5%, while above this ester level the emulsifier is not preferred.

The incorporation of a wax constituent is also not precluded from the furniture polish compositions of the present invention. Again, the level of such a component would be less than required in an ester-free formulation. Typical waxes which could be included are carnauba wax, microcrystalline wax, paraffin wax, beeswax, and the like. Many of these waxes have unique properties, and would be included in only specialty products, rather than the general purpose product, which is the main aim of the present invention.

Fragrance, preservative, for example, formaldehyde, and detergents, can be incorporated at levels generally known in the art. Similarly, the incorporation of a mild abrasive into the water phase, as taught by Canadian Pat. No. 1,041,686 to Stopper, incorporated herein by reference thereto, is not precluded.

Preparation of the Polish Composition

The polish composition is prepared in accordance with the general methods known to the art for forming water-in-oil emulsions. Thus, the oil or continuous phase constituents and the water-disperse phase constituents are each premixed individually. Both premixes are heated in separate vessels, which temperature for the oil premix is between about 140° to about 180° F., depending on the melting point and solubility of the ester constituent and the wax, if wax is present. The temperature of the water phase premix is between about 120° to about 180° F. The water phase is then slowly added to the oil phase using medium- to high-shear agitation. After the water premix has been added, and while continuing the agitation, the mixture is cooled to room temperature. Fragrance may then be added while mixing continues.

The polish composition thus prepared may then be used directly or charged into an aerosol can, which is then capped with an aerosol valve. Any conventional propellent may be used, for example, liquefied gaseous hydrocarbons, halogenated hydrocarbons, or mixtures thereof. Preferred propellants are propane, isobutane, and n-butane. The propellent is present in sufficient quantity to propel substantially all of the polish composition from the container, and is generally about 5 to 25% by weight of the polish composition. Generally, aerosol container pressure is between about 20 to about 40 p.s.i.g.

EXAMPLE 1

Forty-three grams (43.0) montan acid wax (Wax S, American Hoechst Corporation), 13.64 grams polyethylene glycol (Carbowax 200, Union Carbide Corporation), and 0.113 grams paratoluene sulfonic acid (PTSA) were charged to a wide-mouth, round-bottom reaction vessel. Wax S is a pale, hard acid wax derived from montan wax having a drop point (ASTM D566) of 81°–87° C., an acid number (ASTM D 1386) of 135–155, a saponification number (ASTM D 1381) of 155–175, and a density of about 1 gcc at 20° C. Carbowax 200 is a clear, viscous liquid with the generalized formula $HOCH_2-(CH_2OCH_2)_x-CH_2OH$, with a molecular weight range of between about 194 to about 238. Hence, the value of x ranges from about 3 to about 4, this value being an average for the material. The oxyethylene content ranges from 1 to 10 moles.

The molecular weight of Wax S is assumed to be about 425, as discussed above. Hence, about 0.1011 moles Wax S and about 0.0682 moles Carbowax 200 were charged to the reaction vessel, providing a mole ratio of Wax S to Carbowax of about 1.5:1. PTSA is a catalyst in this reaction.

The reaction was conducted at between about 100° to 140° C. for 3 to 4 hours with refluxing. A dry-air purge was maintained on the reaction vessel to remove water formed as a by-product of the reaction.

The reaction product remaining in the vessel was found to have an I.R. stretching frequency of 1745 $cm^{-1}$ characteristic of the carbonyl shift of an ester. The acid number of the sample was about 6.7, as determined by ASTM D 1386, again characteristic of ester formation. Yield was about 60 to 80%.

EXAMPLE 2

A synthesis similar to Example 1 was carried out, the reaction vessel being charged with 31.94 grams (about 0.0752 moles) of Wax S, 15.13 grams Carbowax 200 (about 0.0756 moles), and 0.125 grams of PTSA. The mole ratio of Wax S to Carbowax was about 1:1. The reaction was conducted at between 100° to 160° C. for 4 hours with a dry-air purge. Infrared analysis confirmed the reaction product to be an ester with a significant decrease in acid number. At a 1.0% level the reaction product was soluble in Isopar E and dispersible in water and appeared to from a water-in-oil emulsion, which inverted to an oil-in-water emulsion on standing. The following compositions were made with this reaction product:

|  | Composition A (Wt. %) | Composition B (Wt. %) |
|---|---|---|
| Isopar E | 22.5 | 22.5 |
| Dimethylpolysiloxane blend (200 cs.) | 4.0 | 4.0 |
| Reaction product | 1.0 | 3.0 |
| Sorbitan sesquioleate | 0.5 | 0.0 |
| Deionized water | q.s. 100 | q.s. 100 |

Compositions A and B provided water-in-oil emulsions and when applied to a wood surface exhibited good shine properties. However, Composition A broke faster than if the reaction product was omitted. Even without sorbitan sesquioleate, emulsion of Composition B was relatively stable.

EXAMPLE 3

Forty-three grams Wax S (about 0.1011 mole) were reacted with 13.5 grams Carbowax 200 (about 0.0675 mole) in the presence of PTSA at a temperature of about 200° C., the resulting reaction product having an acid value of about 22.3. The following compositions were prepared in accordance with the procedures described herein:

|  | Composition C (Wt. %) | Composition D (Wt. %) | Composition E (Wt. %) |
|---|---|---|---|
| Isopar E | 22.5 | 22.5 | 22.5 |
| Dimethylpolysiloxane blend (200 cs.) | 4.0 | 4.0 | 4.0 |
| Reaction product | 1.0 | 1.0 | 3.0 |
| Sorbitan sesquioleate | 0.0 | 0.5 | 0.0 |
| Water | q.s. 100 | q.s. 100 | q.s. 100 |

The reaction product in Composition C did not completely dissolve. Reformulation to include 0.5% sorbitan sesquioleate (Composition D) allowed the reaction product to dissolve and form a water-in-oil emulsion. Composition E, incorporating the reaction product at a 3% level gave a thick water-in-oil emulsion. Both Compositions D and E exhibited good polishing characteristics when applied to wood substrates.

EXAMPLE 4

The reaction of Example 3 was carried out with a charge to the reaction vessel of 31.1 grams Wax S (about 0.0732 mole) and 22 grams Carbowax 200 (about 0.110 mole). The resulting reaction product was insoluble in water and in Isopar E. When included at a 1% level in a composition also containing 22.5% Isopar E, 4% dimethylpolysiloxane, 0.5% sorbitan sesquioleate, and water, the water-in-oil emulsion formed initially inverted to form an oil-in-water emulsion. However, the composition provided good rub out and good shine.

EXAMPLE 5

The reaction of Example 2 was repeated, the charge to the reaction vessel being 40.8 grams Wax S (0.096 moles), 19.2 grams Carbowax 200 (0.096 moles), and 0.12 grams PTSA. The reaction mixture was heated to about 185° C. and the reaction carried out for about 3 to 4 hours.

The following compositions were prepared based on the reaction product:

|  | Composition F (Wt. %) | Composition G (Wt. %) |
|---|---|---|
| Isopar E | 22.5 | 22.5 |
| Dimethylpolysiloxane blend (viscosity of about 200 cs.) | 4.0 | 4.0 |
| Reaction product | 1.0 | 3.0 |
| Sorbitan sesquioleate | 0.5 | 0.0 |
| Deionized water | q.s. 100 | q.s. 100 |

Both formed water-in-oil emulsions. When applied to a surface, both compositions had good shine. The emulsion of Composition F broke rather quickly, while Composition G was stable.

EXAMPLE 6

The following compositions were prepared incorporating an ester synthesized by reacting Wax S and Carbowax 200:

|  | Composition H (Wt. %) | Composition I (Wt. %) | Composition J (Wt. %) |
|---|---|---|---|
| Isopar E | 25.0 | 25.0 | 25.0 |
| Dimethylpolysiloxane blend (viscosity of about 600 cs.) | 4.0 | 4.0 | 4.0 |
| Reaction product | 3.0 | 3.0 | 3.0 |
| Sorbitan sesquioleate | 0.0 | 0.1 | 0.0 |
| Sorbitan tristearate | 0.0 | 0.0 | 0.1 |
| Deionized water | q.s. 100 | q.s. 100 | q.s. 100 |
| Viscosity, cs. at 25° C. | 1012 | 600 | 1200 |

In preparing these compositions, the Isopar E, dimethyl polysiloxane, and reaction product were premixed and then heated to 160° F. and stirred to dissolve the reaction product, which took about 3 minutes. To this premix water heated to 126° F. was added at a slow rate under vigorous agitation. The formulations were then mixed under high agitation to effect the emulsion, characterized by a white, creamy liquid. Viscosities were as noted above. Each of these compositions performed as a furniture polish. However, after a time Compositions H and J inverted to an oil-in-water emulsion. Although composition I did not so invert, it appeared to be somewhat unstable.

EXAMPLE 7

The reaction product of Example 1 was used to obtain the following composition:

|  | Composition K (Wt. %) |
|---|---|
| Isopar E | 22.5 |
| Dimethylpolysiloxane blend (viscosity about 600 cs.) | 4.0 |
| Reaction product | 3.0 |
| Deionized water | q.s. 100 |

The first three components were premixed and heated to about 170° F. resulting in a clear solution. Water heated to 150° F. was then added slowly under strong agitation until a uniform viscous emulsion was obtained. The resulting product, upon cooling, had the appearance and water dispersibility characteristics of a water-in-oil emulsion. This product was tested on black piano board for performance, and was observed to provide ease of rub out, shine, and resistance to smears. Similarly, when sprayed from an aerosol can containing 10% hydrocarbon propellent (20 to 40 p.s.i.g.) by weight, the product rubbed to an acceptable shine with good smear resistance. Composition K retained stability over an eight-month period.

We claim:

1. A furniture polish composition characterized by an internal aqueous phase and an external oil phase, the composition comprising on a weight basis:
   (a) from about 10 to about 50% of a hydrocarbon solvent having an initial boiling point above about 85° C. and an end boiling point of below 200° C.;
   (b) from about 0 to about 15% of a polysiloxane or blend of polysiloxanes having an average viscosity of from about 20 to about 30,000 cs at 25° C.;
   (c) from about 0.5 to about 5% of a montan wax ester having the formula:

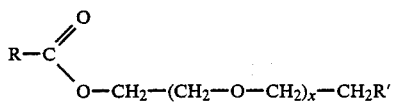

wherein R is the alkyl group of montanic acid, R—COOH; R' is hydrogen or OH, and x has an average value of from 2.5 to about 6.0;
   (d) less than 0.5% of an emulsifier having an HLB of from 2 to 6, the weight ratio of the ester component (c) to said emulsifier (d) being greater than 1:1; and
   (e) from about 30% to about 90% water, said furniture polish composition being a two-phase, single-emulsion composition.

2. The composition of claim 1 wherein the emulsifier is selected from the group consisting of glycol, glycerol, and sorbitol esters of the $C_{12}$ to $C_{18}$ fatty acids.

3. The composition of claim 1 further comprising up to 2% of a wax selected from the group consisting of paraffin wax, beeswax and carnauba wax.

4. The composition of claim 2 wherein the solvent is selected from the group consisting of octane, naphtha, mineral spirits, and isoparaffinic hydrocarbons.

5. The composition of claim 4 wherein the solvent comprises between 15 to 35% of the composition, and wherein water comprises between 60 to 80% of the composition.

6. The composition of claim 5 wherein the ester component (c) has an average value of x is between about 2.5 to 4.5.

7. The composition of claim 6 wherein the emulsifier (d) is between 0.1 to 0.5% of said composition.

8. The composition of claim 7 wherein the ester component (c) comprises from about 0.5 to about 2.5% of said composition.

9. The composition of claim 6 wherein the ester component (c) comprises from about 2.5 to about 4% of said composition.

10. The composition of claim 7 or 8 wherein the weight ratio of the ester component (c) to the emulsifier (d) is greater than 3:1.

11. The composition of claim 6, 8 or 9 wherein the ester component (c) is the reaction product of montanic acid and a polyethylene glycol, said reaction product having an acid value of less than about 30.

12. The composition of claim 11 wherein the mole ratio of montanic acid to polyethylene glycol in the reaction is between about 1:1 to about 1.5:1.

13. The composition of claim 6 wherein the polysiloxane component (b) is selected from the group consisting of dimethylpolysiloxane, diethylpolysiloxane, diphenylpolysiloxane, methylethylpolysiloxane, alkylarylpolysiloxane, and mixtures thereof.

14. The composition of claim 13 wherein the polysiloxane component (b) is a blend having an average viscosity of from about 100 to about 1000 cs. at 25° C., and is present in an amount of from about 2 to about 6%.

15. The composition of claim 1 further comprising an aerosol propellent.

16. A furniture polish composition characterized by an internal aqueous phase and an external oil phase, the composition comprising on a weight basis:
  (a) from about 10 to about 50% of a hydrocarbon solvent having an initial boiling point above about 85° C. and an end boiling point of below about 200° C., said solvent selected from the group consisting of octane, naphtha, mineral spirits, and isoparaffinic hydrocarbons;
  (b) from about 2 to about 6% of a polysiloxane blend having an average viscosity of from about 100 to about 1000 cs at 25° C.;
  (c) from about 0.5 to about 5% of a montan wax ester having the formula:

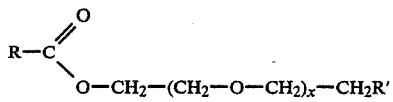

wherein R is the alkyl group of montanic acid, R—COOH: R' is hydrogen or OH, and x has an average value of from 2.5 to 4.5;
  (d) less than about 0.5% of an emulsifier selected from the group consisting of glycol, glycerol and sorbitol esters of oleic, stearic, palmitic and lauric acids, the weight ratio of the ester component (c) to said emulsifier (d) being greater than about 1:1; and
  (e) from about 60 to about 80% water, said furniture polish composition being a two-phase, single-emulsion composition.

17. The composition of claim 16 further comprising up to about 2% wax selected from the group consisting of paraffin wax.

18. The composition of claim 16 wherein the solvent is between 15 to 35% of the composition, and is an isoparaffinic hydrocarbon.

19. The composition of claim 16 wherein the emulsifier component (d) is selected from the group consisting of sorbitan sesquioleate and sorbitan tristearate, and is between 0.1 to 0.5% of the composition.

20. The composition of claim 19 wherein the ester component (c) is between about 0.5 to about 2.5% of the composition.

21. The composition of claim 20 wherein the ratio of ester to emulsifier is greater than 3:1.

22. The composition of claim 16 wherein the ester component (c) is between about 2.5 to 4% of the composition.

23. The composition of claim 16 wherein the ester (c) is the reaction product of montanic acid and polyethylene glycol, the mole ratio of acid to glycol in the reaction being between 1:1 to 1.5:1.

24. A method of making a furniture polish composition characterized by an internal aqueous phase and an external oil phase, the method comprising the steps:
  (a) forming an oil phase premix comprising on a weight basis of the total composition:
    (i) from 10 to about 50% of a hydrocarbon solvent having an initial boiling point above about 85° C. and and end boiling point of below 200° C.
    (ii) from about 0 to about 15% of a polysiloxane or polysiloxane blend having an average viscosity of from about 100 to 1,000 at 25° C.;
    (iii) less than 0.5% of an emulsifier selected from the group consisting of glycol, glycerol and sorbitol esters of oleic, palmitic, stearic and lauric acids, and
    (iv) from about 0.5 to about 5% of a montan wax ester having the formula:

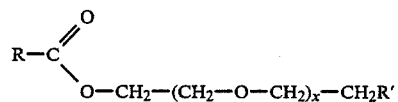

wherein R is the alkyl group of montanic acid R—COOH, R' is hydrogen OH, and x has an average value of from 2.5 to 6.0;
  (b) heating with stirring the premix prepared in (a) to between about 140° to about 180° F. to obtain a homogeneous solution;
  (c) forming an aqueous phase premix;
  (d) heating the premix prepared in (c) to between about 120° about 180° F.;
  (e) slowly adding the premix (d) to the premix (a) with agitation; and
  cooling the result product slowly to room temperature to obtain said furniture polish composition, which is a two-phase, single-emulsion composition.

25. The method of claim 24 wherein the montan ester is the reaction product of montanic acid and polyethylene glycol, the mole ratio of the montanic acid to the polyethylene glycol in the reaction between about 1:1 to about 1.5:1, said reaction product having an acid value of less than about 30.

26. The method of claim 24 wherein the solvent comprises from about 15 about 35% of the composition.

27. The method of claim 24 wherein the emulsifier is from about 0.1 to about 0.5% of the composition and is selected from the group consisting of sorbitan sesquioleate and sorbitan tristearate.

28. The method of claim 27 wherein the ester component comprises from about 0.5 to 2.5% of the composition.

29. The method of claim 24 wherein the ester component comprises between 2.5 to 4% of the composition.

30. The method of claim 24 wherein a paraffin wax is included in the premix (a).

* * * * *